July 4, 1961     H. ULANET     2,991,341

SURFACE-SENSING HERMETICALLY SEALED THERMOSTATS

Filed July 29, 1957     2 Sheets-Sheet 1

*INVENTOR.*
HERMAN ULANET

BY *Milo H. Hutchinson*
*ATTORNEY*

July 4, 1961 H. ULANET 2,991,341
SURFACE-SENSING HERMETICALLY SEALED THERMOSTATS
Filed July 29, 1957 2 Sheets-Sheet 2

INVENTOR.
HERMAN ULANET
BY
*Milo H. Hutchinson*
ATTORNEY

2,991,341
SURFACE-SENSING HERMETICALLY SEALED THERMOSTATS
Herman Ulanet, 473 Richmond Ave., Maplewood, N.J.
Filed July 29, 1957, Ser. No. 674,774
3 Claims. (Cl. 200—138)

This invention relates to thermostats and especially to surface-sensing hermetically sealed thermostats.

In the prior construction of hermetically sealed thermostats using a bimetallic element, the element is suspended in air and any change in ambient temperature must penetrate both the thermostat housing and dead air space prior to reaching the bimetallic element. For aircraft wing deicers, guided missiles, and other electronic application using hermetically sealed thermostats, there is always the problem of obtaining a short thermal path from the outside to the bimetallic element in order to obtain a rapid response to temperature changes.

It is an object of the present invention to provide a thermostat having a thermal conductor from the outside directly to the bimetallic element so that it will respond more rapidly to surface temperature changes than heretofore possible.

Another object is to prevent the bimetallic element from being subjected to strain under ambient temperatures beyond expectation.

A further object is to prevent corrosion or oxidation of the outside surfaces of the thermostat housing so that thermal loss therethrough will be maintained at a minimum.

It is also an object of the instant invention to provide a thermostat with a thermal differential of less than one degree F.

Other objects of the instant invention will become apparent in the course of the following specification.

In the attainment of the aforesaid objectives, subject thermostat is made in four embodiments. Each embodiment is formed with a hermetically sealed closure or housing which has a thermal sensing member. In each embodiment is a bimetallic element one end of which is fixed to the sensing member by a thermal conductor and the opposite end of which is free. Coacting with and electrically insulated from the free end of the bimetallic element is the free end of one of a pair of spring contact members both of which are in spaced relationship with the bimetallic element. The opposite or fixed ends of the contact members are electrically insulated from each other and each is connected to a terminal of either the solder or plug-in type inserted through the closure. An adjustment screw in operable engagement with one spring contact member permits calibration and an insulator on the free end of the bimetallic element opens the contact members in response to a predetermined temperature. In the first embodiment, solder type terminals are used with one end of the bimetallic element fixed to a base sensing member. The second embodiment differs from the first in that plug-in type terminals of special design are used in lieu of the solder type terminals of the first embodiment. In the third embodiment, one end of the bimetallic element is fixed to the header which serves as the sensing member. In the fourth embodiment, a portion of the base sensing member is turned to permit mounting the thermostat on the side in situations where upright mounting would be impractical.

The invention will appear more clearly from the following detailed description when taken in conjunction with the accompanying drawings showing by way of example the preferred embodiments of the inventive concept.

In the drawings where like reference numerals indicate like parts:

FIGURES 1–4 show the first embodiment of the thermostat constructed in accordance with the principles of this invention and in which:

FIGURE 1 is a front elevational view of the thermostat;

FIGURE 2 is a top view of the thermostat shown in FIGURE 1;

FIGURE 3 is an enlarged longitudinal sectional view of the thermostat shown in FIGURES 1 and 2; and FIGURE 4 is an enlarged sectional view along the line 4—4 of FIGURE 2.

FIGURES 5 and 6 show the second embodiment of the thermostat and in which:

FIGURE 5 is an enlarged fragmentary sectional view of the top of the thermostat shown in FIGURE 3 but differing therefrom by having plug-in type terminals rather than solder type terminals; and FIGURE 6 is a sectional view along the line 6—6 of FIGURE 5.

Figure 1:
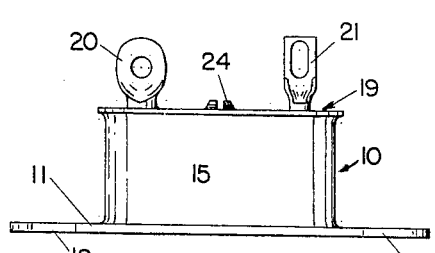
Figure 2:
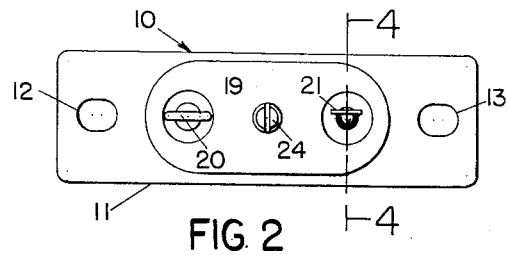

Referring now to the first embodiment of the thermostat shown in FIGURES 1–4, reference numeral 10 indicates the thermostat.

Figure 3:
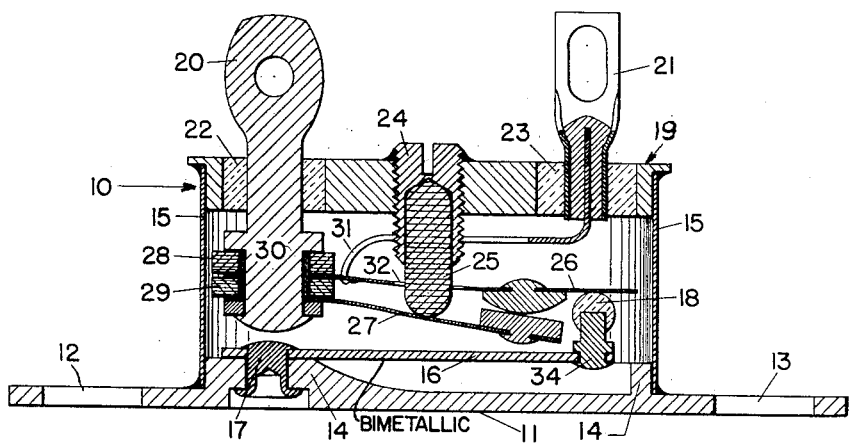
Figure 4:
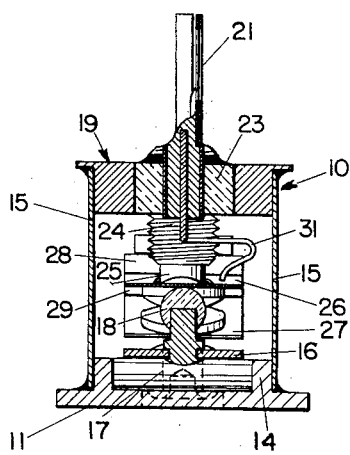

The thermostat 10 is constituted of a base thermal sensing member 11 of good thermal conductivity, like copper, and may be plated or coated with an anti-corrosion or anti-oxidation material of good thermal conductivity such as gold. At each end of the member 11 are openings 12 and 13 for the insertion of any suitable fasteners, not shown, which may be used to secure the thermostat in position. Upwardly directed from and integrally or otherwise formed with the member 11 is a shoulder 14 which curves upwardly at the left as shown in FIGURE 3. The shoulder 14 supports an upwardly directed sleeve 15 which may be sealed to the member 11 by solder or other suitable means. Obviously, the base and sleeve could be made in one piece and a portion of the shoulder eliminated.

Within the partial closure or housing thus formed is a bimetallic element 16 fixed at one end to the previously mentioned upwardly curved portion of the shoulder 14 by a thermal conductor 17 of copper or other material of good conductivity. On the outer surface of the base thermal sensing member 11, the thermal conductor 17 may be countersunk, as illustrated, and sealed therein by any suitable means such as solder. The free end of the bimetallic element 16 is thus suspended in air as further illustrated so that when subjected to extraordinary ambient temperatures it will return to the normal position without damaging strain. On the free end of the bimetallic element 16 is an upwardly directed insulator 18, such as a smooth surfaced bead of glass, which may be fastened to the element by any suitable means such as the metal stud 34. The purpose of the smooth surfaced glass bead is to increase the life of the thermostat by minimizing friction and at the same time to provide substantially uniform operation during the life expectancy.

Over the open top of the upwardly directed sleeve 15 is a header 19 which may be sealed therein by solder or other known means. Through the header 19 are the spaced and inwardly and outwardly directed ends of the solder type terminals 20 and 21 which are held therein by the similar glass seals 22 and 23, respectively, as most clearly shown in FIGURE 3, the glass seals having a coefficient of expansion substantially the same as that of both the header and the terminals. Intermediate the terminals and threaded through the header is an adjustment screw 24 with an insulator tip 25 which passes through an opening 32 (FIG. 3) in the following described spring contact member 26 to engage the contact member 27. After adjustment for the desired tripping temperature, the screw 24 may be sealed in the header by known means.

Also within the closure is a contact switch assembly constituted of the spring contact members 26 and 27 one end of each of which is fastened by suitable means to the inner end of the terminal 20. At the ends thus fixed, the contact members are insulated from each other by the insulating washers 28 and 29 while the contact member 26 is insulated from the terminal 20 by the insulating tube 30. The inner end of the terminal 21 is electrically connected to the contact member 26 by the conductor 31.

The free end of the contact member 26 protrudes beyond the free end of the contact member 27 (FIG. 3) and the protruding end is operably engaged by the smooth surfaced glass bead or insulator 18 secured to the free end of the bimetallic element 16 by the previously mentioned stud 34.

Figure 5:
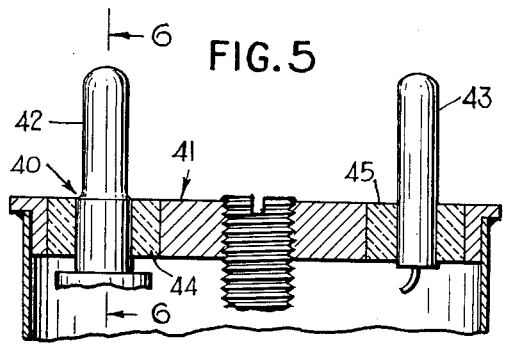
Figure 6:
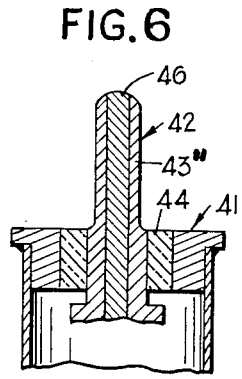

Referring now to the second embodiment of the thermostat shown in FIGURES 5 and 6, reference numeral 40 (FIG. 5) indicates the thermostat which is similar to the previously described first embodiment except that through the header 41 are two spaced parallel plug-in type terminals 42 and 43 in place of the solder type terminals of the first embodiment. Also, the base, not shown, of the second embodiment thermostat may be terminated at each end of the closure since no mounting means is necessarily required.

Each plug-in type terminal 42 and 43 is constituted of an outer shell 43″ (FIG. 6) having a coefficient of expansion substantially equal to the coefficient of expansion of the compression glass seals 44 and 45, respectively, with which the terminals are sealed in the header 41, and also equal to the coefficient of expansion of the header. Within the outer shell 43″ (FIG. 6) is an inner core 46 of copper or the like which has good thermal and electrical conductivity.

Figure 7:
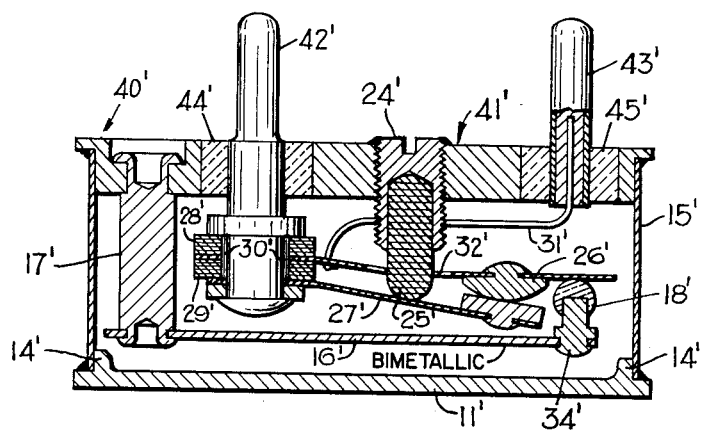
FIGURE 7 shows the third embodiment and is an enlarged sectional view of the thermostat shown in FIGURES 5 and 6 but differing therefrom by having one end of the bimetallic element supported from the header rather than from the base as in the first two embodiments.

Referring now to the third embodiment of the thermostat shown in FIGURE 7, reference numeral 40′ indicates the thermostat which is constituted of the base member 11′ on which is an upwardly directed shoulder 14′ supporting the further upwardly directed sleeve 15′. The open top of the sleeve 15′ is closed by the header thermal sensing member 41′ which may be sealed in the open top to form a substantially hermetically sealed closure or housing.

Similar to the previously described embodiments, a spring contact assembly, formed with the spring contact members 26′ and 27′, is inserted in the closure with one end of each fixed to the inner end of the terminal 42′, and insulated from each other by the electrical insulators 28′ and 29′. The spring contact member 32′ is also insulated from the terminal 42′ by the insulating sleeve 30′ and then connected to the plug-in terminal 43′ by the conductor 31′.

The plug-in terminals 42′ and 43′ are held in the header 41′ by the compression glass seals 44′ and 45′, respectively, with the coefficient of expansion of the terminals, seals, and header substantially the same as in the previously mentioned embodiments. The adjustment screw 24′ is similar to that of the first and second embodiments with the insulated tip 25′ passing through an opening 32′ in the spring contact member 26′.

The bimetallic element 16′, unlike that of the first two embodiments, has one end fixed to the inner end of a thermal conductor 17′ which is held by and inwardly directed from the header thermal sensing member 41′. The free end of the bimetallic element 16′ is equipped with the previously mentioned smooth surfaced glass bead 18′ or the like which is fastened by the metallic stem 34′ to the element, the glass bead being in operable engagement with the protruding end of the spring contact member 26′.

Figure 8:
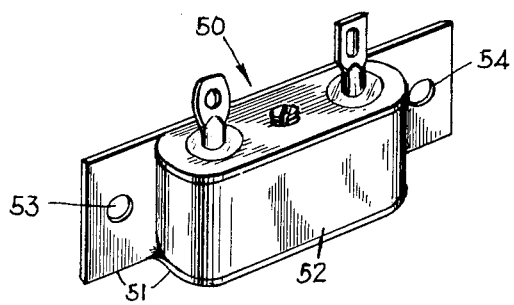
FIGURE 8 shows the fourth embodiment and is a perspective view thereof.

Referring now to the fourth embodiment of the thermostat shown in FIGURE 8, reference numeral 50 indicates the thermostat. The thermostat 50 is similar to the previously described first embodiment except that the base thermal sensing member 51 is cut away along one edge at each corner with the opposite edge turned upwardly at around 90 degrees to the first mentioned portion. The turned up portion protrudes beyond each end of the closure 52 and is provided with the openings 53 and 54 to facilitate side mounting in those situations where space for upright mounting is limited.

In operation:

In the first embodiment, temperature changes are transmitted directly from the base thermal sensing member to the bimetallic element by both the base member and by the thermal conductor 17. In the second embodiment, the heat transfer is substantially the same as in the first embodiment but with the position of the thermostat inverted in some cases. In the third embodiment, the header is the sensing member but transmits temperature changes directly from the header through thermal conductor 17′ to the bimetallic element. In the fourth embodiment, temperature changes are transmitted as in the first two embodiments. Of course, it is possible to have the bimetallic element held by a thermal conductor which interconnects both the base member and the header.

While normally closed contacts have been illustrated as well as described, normally open contacts could be used. In addition, it will be obvious that while only four embodiments have been illustrated and described, other modifications could be made within the scope of the appended claims.

What is claimed is:

1. A thermostat comprising
a hermetically sealed closure,
highly heat conductive thermal-sensing means extending between the outside and inside of the closure,
a thermal-sensitive, bimetallic strip in the closure secured at one end to the thermal-sensing means and freely suspended at its opposite end,
a header on the closure,
a first hermetic seal in the header,
a first terminal mounted in the first seal extending externally and internally to the closure,
a first electrically conductive spring mounted on the first terminal within the closure, the first spring being electrically insulated from the first terminal and having a passage intermediate its ends,
a second electrically conductive spring mounted on the first terminal within the closure, the second spring being electrically connected to the first terminal but electrically insulated from the first spring,
a first electrical contact mounted on the first spring,
a second electrical contact mounted on the second spring opposite the first contact, the said contacts adapted to engage and disengage each other,
an adjustment screw threadably engaged to the header,
an electrically non-conductive post on the screw extending into the closure through the passage in the first spring and adapted to engage the second spring,
an electrically non-conductive stud secured to the freely suspended end of the bimetallic strip, the stud extending in the direction of the first spring and adapted to engage and disengage the first spring upon bending of the strip in response to temperature changes thereof,
a second hermetic seal in the header,
a second terminal mounted in the second seal extending externally to the closure, and
means for electrically connecting the second terminal to the first spring.

2. A thermostat comprising
a hermetically sealed closure, a highly heat conductive base on the closure, an internal, raised shoulder on the base, a thermal-sensitive, bimetallic strip secured at one end to the shoulder, the opposite end of the bimetallic strip being freely suspended, a header on the closure, a first hermetic seal in the header, a first terminal mounted in the first seal and extending externally and internally of the closure, a first electrically conductive spring mounted on the first terminal within the closure, the first spring being electrically insulated from the first terminal and having a passage intermediate its ends, a second electrically conductive spring mounted on the first terminal within the closure, the second spring being electrically connected to the first terminal but electrically insulated from the first spring, a first electrical contact mounted on the first spring, a second electrical contact mounted on the second spring opposite the first contact, the said contacts adapted to engage and disengage each other, an adjustment screw threadably engaged to the header, an electrically non-conductive post on the screw extending into the closure through the passage in the first spring and adapted to engage the second spring, an electrically non-conductive stud secured to the freely suspended end of the bimetallic strip, the stud extending in the direction of the first spring and adapted to engage and disengage the first spring upon bending of the bimetallic strip in response to temperature changes thereof, a second hermetic seal in the header, a second terminal mounted in the second seal extending externally and internally to the closure, and means for electrically connecting the second terminal to the first spring.

3. A thermostat comprising the structure in accordance with claim 1 in which at least that portion of both the first and second terminals passing through the respective seals is provided with an external shell of material having a coefficient of thermal expansion substantially equal to that of the seal and an inner core of highly electrically conductive material, a portion of said inner core being exposed both externally and internally of the closure.

References Cited in the file of this patent

UNITED STATES PATENTS

| | | |
|---|---|---|
| 1,650,979 | Brace | Nov. 29, 1927 |
| 2,261,412 | Reeve | Nov. 4, 1941 |
| 2,294,482 | Siegmund | Sept. 1, 1942 |
| 2,433,687 | Durst | Dec. 30, 1947 |
| 2,500,760 | Lee | Mar. 14, 1950 |
| 2,664,455 | Williamson | Dec. 29, 1953 |
| 2,723,336 | Swenson et al. | Nov. 8, 1955 |
| 2,767,284 | Moksu | Oct. 16, 1956 |
| 2,773,955 | Haydon et al. | Dec. 11, 1956 |
| 2,774,846 | Lee | Dec. 18, 1956 |
| 2,809,253 | Broekhuysen | Oct. 8, 1957 |
| 2,824,933 | Shanley | Feb. 25, 1958 |